United States Patent
Wilhelm

(10) Patent No.: US 11,391,688 B2
(45) Date of Patent: Jul. 19, 2022

(54) SENSOR ELEMENT FOR A POTENTIOMETRIC SENSOR

(71) Applicant: Endress+Hauser Conducta GmbH+Co. KG, Gerlingen (DE)

(72) Inventor: Thomas Wilhelm, Chemnitz (DE)

(73) Assignee: ENDRESS+HAUSER CONDUCTA GMBH+CO. KG, Gerlingen (DE)

( * ) Notice: Subject to any disclaimer, the term of this patent is extended or adjusted under 35 U.S.C. 154(b) by 615 days.

(21) Appl. No.: 16/378,962

(22) Filed: Apr. 9, 2019

(65) Prior Publication Data

US 2019/0310224 A1    Oct. 10, 2019

(30) Foreign Application Priority Data

Apr. 9, 2018 (DE) ...................... 10 2018 108 302.5
Feb. 8, 2019 (DE) ...................... 10 2019 103 174.5
Apr. 4, 2019 (DE) ...................... 10 2019 108 890.9

(51) Int. Cl.
*G01N 27/333* (2006.01)
*G01N 27/36* (2006.01)

(52) U.S. Cl.
CPC ........... *G01N 27/333* (2013.01); *G01N 27/36* (2013.01)

(58) Field of Classification Search
CPC ..... G01N 27/333; G01N 27/36; G01N 27/308
See application file for complete search history.

(56) References Cited

U.S. PATENT DOCUMENTS

| | | | |
|---|---|---|---|
| 3,458,422 A | 7/1969 | Proctor, Jr. | |
| 3,825,482 A | 7/1974 | Wechter et al. | |
| 4,282,079 A | 8/1981 | Chang et al. | |
| 4,632,732 A * | 12/1986 | Fog | G01N 27/36 204/416 |
| 5,681,784 A * | 10/1997 | Friese | C04B 35/62813 501/103 |
| 2002/0068370 A1* | 6/2002 | Dwyer | B81C 1/00666 438/14 |
| 2004/0163949 A1* | 8/2004 | Sorensen | G01N 27/301 204/280 |

(Continued)

FOREIGN PATENT DOCUMENTS

| | | |
|---|---|---|
| CN | 105823814 A | 8/2016 |
| CN | 107037107 A | 8/2017 |

(Continued)

OTHER PUBLICATIONS

Macinnes, D. A.; Dole,Malcolm: The behavior of glass electrodes of different compositions. In: Journal of the American Chemical Society, vol. 52, 1930, No. 1, S. 29-36.—ISSN 0002-7863.

(Continued)

*Primary Examiner* — Alvaro E Fortich
*Assistant Examiner* — Zannatul Ferdous
(74) *Attorney, Agent, or Firm* — Christopher R. Powers; Endress+Hauser (USA) Holding Inc.

(57) ABSTRACT

The present disclosure relates to a sensor element for a potentiometric sensor including a substrate, and a potentiometric sensor layer disposed on the substrate, wherein the substrate includes at least one region electrically conductively connected to the sensor layer, and wherein at least the region of the substrate electrically conductively connected to the sensor layer is a mixed-conducting ceramic.

24 Claims, 4 Drawing Sheets

(56) References Cited

U.S. PATENT DOCUMENTS

| | | | |
|---|---|---|---|
| 2005/0203231 A1* | 9/2005 | Halpert | C04B 41/5127 524/413 |
| 2006/0087324 A1 | 4/2006 | Berggren et al. | |
| 2008/0101434 A1* | 5/2008 | Horovitz | G01N 27/16 374/29 |
| 2018/0141874 A1* | 5/2018 | Latief | C04B 41/009 |
| 2018/0372671 A1* | 12/2018 | Kjaer | G01N 27/301 |

FOREIGN PATENT DOCUMENTS

| | | | | |
|---|---|---|---|---|
| DE | 2538739 A1 | 3/1976 | | |
| DE | 2617155 A1 | 11/1977 | | |
| DE | 3639518 A1 | 6/1987 | | |
| DE | 3639312 A1 | 5/1988 | | |
| DE | 3814735 A1 | 11/1989 | | |
| DE | 19620568 A1 | 11/1997 | | |
| DE | 19714474 A1 | 10/1998 | | |
| DE | 10030106 A1 * | 2/2002 | | B28B 1/16 |
| DE | 10111721 A1 | 8/2002 | | |
| DE | 10252481 A1 | 5/2004 | | |
| DE | 10305005 A1 | 8/2004 | | |
| DE | 102007016197 A1 | 10/2008 | | |
| DE | 102009007851 A1 | 8/2010 | | |
| DE | 10 2010 015551 A1 | 10/2011 | | |
| DE | 102014105575 A1 | 10/2015 | | |
| DE | 102014016776 A1 | 5/2016 | | |
| DE | 102016202083 A1 | 8/2017 | | |
| DK | 135343 B | 4/1977 | | |
| EP | 0103599 B1 | 9/1987 | | |
| EP | 0299778 A2 | 1/1989 | | |
| EP | 1 231 189 A1 | 8/2002 | | |
| EP | 1962086 A2 | 8/2008 | | |
| EP | 1269172 B1 | 5/2009 | | |
| GB | 1320617 A | 6/1973 | | |
| GB | 1559289 A | 1/1980 | | |
| JP | 06231771 A | 8/1994 | | |
| JP | 2003123772 A | 4/2003 | | |
| SU | 759943 A1 | 8/1980 | | |
| WO | 0165247 A1 | 9/2001 | | |

OTHER PUBLICATIONS

Galster, Helmuth: pH-Messung : Grundlagen,Methoden, Anwendungen, Gerate. Weinheim : VCH, 1990. S.135-136.—ISBN 3-527-27836-2.
Norm RAL-RG 529 A3 2007-07-00. Email(le) und emaillierte Erzeugnisse -Begriffsbestimmungen/zeichnungsvorschriften. S . 1-6.
Nikolskii, B. P. [ et al.]: Solid Seiten 20-21,24 Verweis auf SU 759 X 943 A1 contact in mebrane ion-selective electrodes. In: Ion-Selective electrode reviews, vol. 7, 1985, S. 3-39.—ISSN 0191-5371.
Schultz, M. M., [et al ] The Fig.1b'electrode composed from glasses with ionic and mixed ion-electronic conductivity, Fiz.Tim. Stekla (Russ. f. Phys.Chem. Glass), 7 (1981) 426,432. Jg.
Schultz, Mikhail Mikhailovich Abb. 1b' (ЦЦУIbL, Muxann Mnxan-nobny), A. M.Pisarewskii, C.E. Wolkow, G. P. Lepnew, J. M. Artmew, J. M. Nikolajew: Elektroden aus Gläsem mit ionischen und ionisch-elektronischen Leitfähigkeiten ЭЛЕКТРОД СОСТАВЛЕПНЫШ ИЗ СТЕКОЛ С ИОННОЙ И ИОННО-ЭЛЕКТРОННОЙ ПРОВОДИМОСТЯМИ , Phys. Chim. stekla 7 (1981) 426-432.
Vonau, Winfried ; Kaden, Heiner: Glass membrane electrodes with solid state internal contacts for pH and pNa measurements. In: Glass science and technology: International Journal of the German Society of Glass Technology. Glastechnische Berichte, vol. 70, 1997, No. 5, S. 155-160.—ISSN 0946-7475.
Timofeev, V. V.: Solid-contact The transducer layer consisted of the Y ion-selective electrodes with 1:1:1 mass Yatio of Fe2+/Fe3+ copper hexacyanoferrate in the copper(ll) hexacyanoferrate, PVC, transducer layer. In: Russian and carbon black. Journal of Electrochemistry, vol. 54, 2018, No. 4, S. 400-408.—ISSN 1023-1935.
Belyustin, Anatolii A , The centenary of glass electrode: from Max Cremer to F.G.K. Baucke, Journal of Solid State Electrochemistry, vol. 15, Nr. 1, 2011, pp. 47-65.
Riess, Ilan, CRC Handbook of Solid State Electrochemistry, 1997, pp. 223-234,260-268.
Vonau, W.; Gabel, J.; Jahn, H., Potentiometric all solid-state pH glass sensors, Electrochimica Acta, 50, Jul. 2005, pp. 4981-4987.
Schultz, Mikhail Mikhailovich, et al., Possibility of Improving the Characteristics of Glass Electrodes for pH Measurement, Journal of Applied Chemistry of the USSR, vol. 59, 1986, No. 3, pp. 477-483.

* cited by examiner

SENSOR ELEMENT FOR A POTENTIOMETRIC SENSOR

CROSS-REFERENCE TO RELATED APPLICATIONS

The present application is related to and claims the priority benefit of German Patent Application Nos. 10 2018 108 302.5, filed on Apr. 9, 2018, 10 2019 103 174.5, filed Feb. 8, 2019, and 10 2019 108 890.9, filed on Apr. 4, 2019, the entire contents of which are incorporated herein by reference.

TECHNICAL FIELD

The present disclosure relates to a sensor element for a potentiometric sensor, a potentiometric sensor, and a production method.

BACKGROUND

Potentiometric sensors are used in the laboratory and process measurement technology in many areas of chemistry, biochemistry, pharmacy, biotechnology, food technology, water management, and environmental monitoring for the analysis of measuring media, especially, measuring fluids. Potentiometric sensors allow detection of activities of chemical substances, such as ion activities, and therewith correlated measured variables in liquids. The substance, the activity or concentration of which is to be measured is also referred to as an analyte. The potentiometric sensor according to the present disclosure that is described below may, for example, be used to measure a measured variable which is dependent upon the activity of an analyte in a measuring medium. This measured variable can, for example, be an activity or a concentration of the analyte, such as a specific ion species or a pH value. The measuring medium can be a measuring fluid, such as an aqueous solution, emulsion or suspension.

Potentiometric sensors typically comprise a measuring half-cell and a reference half-cell as well as a measurement circuit. For measurement, the measuring half-cell and the reference half-cell are brought into contact with the measuring medium. In contact with the measuring medium, the measuring half-cell forms a potential that is a function of the activity of the analyte in the measuring medium, whereas the reference half-cell provides a stable reference potential independent of the analyte concentration. The measurement circuit generates an analog or digital measuring signal which represents the potential difference between the measuring half-cell and the reference half-cell and, consequently, the activity of the analyte in the measuring medium. The measuring signal may be output from the measurement circuit to a higher-level unit which is connected to the sensor and further processes the measuring signal. The higher-level unit may be a measuring transducer or a process controller, such as a PLC.

The reference half-cell of conventional potentiometric sensors is often adapted as a second-type electrode, e.g., as a silver/silver chloride reference electrode, and electrically conductively connected to the measurement circuit.

The measuring half-cell comprises a potential-forming sensor element which, depending on the type of potentiometric sensor, may comprise an ion-selective membrane (ion-selective electrodes, pH electrodes) or an inert, non-selective electrode (redox electrode) made of an electrically conductive material, for example a noble metal. Examples of potentiometric measuring half-cells are ion-selective electrodes (ISE). A traditional ion-selective electrode has a housing that is closed by the ion-selective membrane and accommodates an inner electrolyte that is in contact with the membrane. The ion-selective electrode also comprises a terminal lead which is in contact with the inner electrolyte. The terminal lead is electrically conductively connected to the measurement circuit. If the ion-selective membrane for measuring is in contact with the measuring medium, the membrane selectively interacts with a certain ionic species contained in the measuring medium, namely with the analyte. Changing the activity or concentration of the ion in the measuring medium causes a relative change in the equilibrium galvanic voltage between the measuring medium and the terminal lead in contact with the ion-selective membrane via the inner electrolyte. A special case of such an ion-selective electrode, namely an electrode that selectively detects the $H^-$ or hydronium ion activity in a measuring fluid, is the known pH glass electrode, which comprises a glass membrane as the ion-selective membrane.

It has long been attempted to improve the design of measuring half-cells of potentiometric sensors with the goal of saving costs, simplifying production, and maintaining a greater robustness and longer service life. One approach that has been picked up again and again is the use of a solid terminal lead, which manages to do without an inner electrolyte contacting the ion-selective membrane. Some of the approaches in this respect are described in the textbook H. Galster, "pH-Messung—Grundlagen, Methoden, Anwendungen, Geräte" [pH Measurement—Fundamentals, Methods, Applications, Devices], VCH Verlagsgesellschaft mbH, Weinheim, 1990, pp. 135-136.

From DE 10 2010 015551 A1 is known a sensor element with an ion-selective electrode and a reference electrode, which are applied to a substrate made of several films of an insulating ceramic arranged in layers one above the other. The ion-selective electrode is formed by a metallic surface arranged on one of the ceramic layers and covered by an ion-selective membrane. The metallic surface is contacted by a metallic conductor path applied to an inner layer of the substrate. The metallic surface and the conductor path thus form a fixed contact of the membrane. The reference electrode is also formed on the ceramic substrate by a glass-like, ion-conducting layer and a polymer layer covering it. Like the ion-selective electrode, the reference electrode is electrically contacted by means of a metallic conductor path arranged on an inner layer.

The arrangement described in DE 10 2010 015551 A1 is relatively complex and expensive to produce. For example, the ceramic films forming the individual layers of the sensor element must be processed and coated and brought into correct alignment with one another.

SUMMARY

The aim of the present disclosure is to provide a sensor element for a potentiometric sensor which is simple and thus also inexpensive to produce. The sensor element should preferably be able to be used to realize a miniaturizable, thermally and mechanically robust sensor.

This aim is achieved by a sensor element according to the present disclosure. The present disclosure also relates to a potentiometric sensor having a sensor element according to the present disclosure, a method for producing a ceramic body according to the present disclosure, and a further sensor element according to the present disclosure. Advantageous embodiments and variants are specified in dependent claims.

The sensor element according to the present disclosure for a potentiometric sensor comprises a substrate and a potentiometric sensor layer arranged on the substrate, wherein the substrate includes at least one region electrically conductively connected to the sensor layer, and wherein at least the region of the substrate electrically conductively connected to the sensor layer consists of a mixed-conducting ceramic.

In a first embodiment, the sensor layer may form an inert, non-selective electrode, e.g., made of a metal, such as a noble metal, a semiconductor, such as a highly doped or degenerated semiconductor, or a carbon-based material. Platinum, gold, or rhodium may be used as metal, for example. The carbon-based material may be graphite, glassy carbon, or boron-doped diamond. Such an electrode is non-selective in the sense that different ions or molecules contained in a solution contacting the electrode may give electrons to the electrode or accept electrons therefrom, and that the potential detectable with the electrode against a potential-constant reference electrode, e.g., an Ag/AgCl electrode, is thus influenced by the sum of the redox-active ions or molecules in the solution. A sensor layer adapted in this way may serve to measure the redox potential of a measuring solution.

In a second embodiment, the sensor layer may form an ion-selective layer. This layer may, for example, be formed like the aforementioned ion-selective membranes of known potentiometric sensors from a pH-selective or Na-selective glass or from a polymer comprising an ionophore.

A mixed-conducting ceramic, as used herein, means a ceramic that is both ion-conducting and electron-conducting. The sensor element may form a measuring half-cell of a potentiometric sensor, wherein the mixed-conducting ceramic of the substrate serves as a solid terminal lead contacting the sensor layer, for example, directly, i.e., without further intermediate layers. The structure of the sensor element may thus be realized in a much simpler and more cost-effective manner than the structure of the sensor element known from DE 10 2010 015551 A1.

The electrically conductive connection between the region of the substrate consisting of the mixed-conducting ceramic and the sensor layer may be an electron-conducting and/or ion-conducting, for example, mixed-conducting, connection. This electrically conductive connection may be formed by electrically and/or ion-conducting, for example, mixed-conducting, intermediate layers. It may also be formed by the sensor layer being in direct contact with the mixed-conducting region of the substrate.

In an advantageous embodiment, the substrate is a body formed from the mixed-conducting ceramic. No additional mechanical reinforcement of the substrate is thus necessary because the body may be designed to be self-supporting. In this case, the sensor element may be formed by the body and the sensor layer directly applied to the body. Due to the significantly larger mass of the mixed-conductive body contacting the sensor layer in comparison to the metallic contacting for the ion-selective membrane in the sensor known from DE 10 2010 015551 A1, a measuring half-cell formed by means of the sensor element is correspondingly substantially less sensitive with regard to polarization effects than the ion-selective electrode known from the prior art. The body may have various shapes; it may, for example, be adapted as a rod, plate or small plate, as a solid cylinder or as a hollow cylinder.

In an alternative embodiment, the substrate may be formed by one or more layers applied one above the other to a base body, for example, a metallic or ceramic base body, wherein the layer consists of the mixed-conducting ceramic. In a variant of this embodiment, a plurality of layers may also be applied to the base body, wherein one or more of the layers or all layers are formed from the mixed-conducting ceramic. Advantageously, the one or all ceramic layers together have a thickness of at least 100 μm, preferably at least 500 μm, in order to reduce polarization effects.

Advantageously, the unit formed from the substrate and the sensor layer is surrounded by a sheath made of an electrically insulating material such that the sheath only leaves uncovered a surface region of a surface of the sensor layer facing away from the substrate and insulates the substrate and the interface arranged between the substrate and the sensor layer from a measuring medium surrounding the sensor element. In this way, the substrate and the interface formed between the substrate and the sensor layer are protected from contact with a measuring medium while the uncovered surface region of the sensor layer is in contact with the measuring medium.

The sheath may be formed, for example, from a glass or an insulating polymer material. The sheath may be formed by a glass containing additives. Suitable additives may include, for example, partially fused or non-fused oxides. In an advantageous embodiment, the sheath may be applied by known methods of enamel fabrication to the unit formed from the substrate and the sensor layer, e.g., by dry application of a powder comprising glass particles or by wet application of a suspension comprising glass particles onto the unit and by subsequent thermal treatment of the applied powder or suspension to form a glass layer forming the sheath. The glass layer thus produced forms an enamel-like coating. According to the definitions/labeling standards, RAL registration RAL-RG 529 A2 from July 2007 by RAL Deutsches Institut für Gütesicherung and Kennzeichnung e.V., a vitreous material that is produced by completely or partially melting substantially oxidic raw materials, is referred to as an enamel. The inorganic preparation thus produced is applied with additives in one or more layers to workpieces made of metal or glass and fused at temperatures above 480° C. Since the substrate in the case of the presently described embodiment of the present disclosure consists at least in part of a mixed-conducting ceramic instead of metal or glass, a sheath formed from particles of an inorganic glass preparation consisting substantially of oxidic raw materials is not an enamel within the meaning of said RAL registration but has enamel-like properties and is produced by analogous production methods as are known from enameling technology.

The glass particles may advantageously have one of the compositions described in EP 1 231 189 A1.

The sheath may also be formed from multiple layers. In one possible embodiment, one of the layers may be one of the above-described enamel-like coatings of a glass composition.

If the sensor layer is adapted as an ion-selective layer, it may be formed from an ion-selective glass, for example, a pH membrane glass or a sodium-selective, potassium-selective, or lithium-selective membrane glass, from an ion-conducting metal salt, or from a matrix material comprising an ionophore. The matrix material comprising the ionophore may, for example, be a polymer material. If the sensor layer is intended for potentiometric measurement of the pH value, a lithium-containing, preferably sodium-free, pH membrane glass is preferred since such a glass exhibits a reduced cross-sensitivity to Na ions in the measuring solution.

The sensor layer, for example, in its design as an ion-selective layer, may be adapted as a single-layer or multi-layer coating applied directly to the substrate. The coating may, for example, be formed from several layers of the same glass material or polymer material. Alternatively, the coating may be formed from multiple layers of different glass materials and/or polymer materials. For example, layers close to the substrate may have a high electrical conductivity but only little or no ion selectivity, and the final layer intended for contact with a measuring medium may be formed from an ion-selective membrane glass, e.g., a pH membrane glass or a Na membrane glass.

The mixed-conducting ceramic may comprise at least one base material, e.g., an oxide, silicate, carbide, or nitride, and at least one mixed-conducting additive. The base material may, for example, be $Al_2O_3$ (aluminum oxide) or $ZrO_2$ (zirconium dioxide) optionally stabilized by additives, e.g., by $Y_2O_3$ (yttrium oxide). A mixed-valent oxide may, for example, be used as the conductive additive. The ceramic may also comprise several conductive additives, e.g., several mixed-valent oxides.

The mixed-valent oxide may be a mixed-valent transition metal oxide, e.g., $Fe_3O_4$ (iron(II,III) oxide, e.g., magnetite), a tungsten bronze, a molybdenum bronze, or a mixed-valent compound of the structure type of the tungsten bronzes. Suitable tungsten bronzes are compounds of formula $A_xWO_3$, where x is between 0 and 1 and A is an alkali metal.

The ceramic may contain one or more further metal oxides as additives, e.g., oxides of metals of groups 5 to 10 of the periodic table (corresponding to CAS nos. Vb to VIIIb) or oxides of lanthanum or lanthanoids.

The at least one mixed-valent oxide may have a mass fraction in the ceramic of 25 to 90%. The mass fraction is advantageously more than 50%, preferably more than 70%, particularly preferably more than 75%. If a plurality of mixed-valent oxides are present as conductive additives, the sum of their mass fractions in the ceramic is advantageously more than 50%, preferably more than 70%.

The coefficient of thermal expansion of the substrate advantageously differs from the coefficient of thermal expansion of the sensor layer by a maximum of ±10%. This ensures that the sensor element remains mechanically stable even if it is exposed to severe temperature fluctuations. Advantageously, the components forming the mixed-conducting ceramic and the material forming the sensor layer are correspondingly matched to one another in order to achieve such a matching of the coefficients of thermal expansion.

Insofar as the sensor element comprises a sheath, made of an electrically insulating material, of the unit formed from the substrate and the sensor layer, this material advantageously has a coefficient of expansion which differs from the coefficient of thermal expansion of the sensor layer by a maximum of ±10%. If the insulating material is formed from a glass composition applied to the substrate and the sensor layer by a method of enamel fabrication, the coefficient of expansion of the sheath may be adjusted by suitably selecting the components of the glass composition.

To contact the sensor element by a measurement circuit, the region of the substrate that is electrically conductively connected to the sensor layer may be electrically conductively connected to a terminal lead made of an electrically conducting material, for example, a metal or a material based on carbon. If the sensor element has an insulating sheath that leaves uncovered only a region of the surface of the sensor layer, the terminal lead may be fed through the sheath to contact the substrate. The contacting between the substrate and the terminal lead may be arranged on a side of the substrate facing away from the sensor layer.

The present disclosure also comprises a potentiometric sensor, having at least one sensor element according to one of the above-described embodiments, having a reference electrode and a measurement circuit which is electrically conductively connected to the sensor element and to the reference electrode and designed to detect a potential difference between the sensor element and the reference electrode. The sensor may be used to determine a measured value that depends on the concentration or activity of an analyte, for example, of an analyte ion, in a measuring medium. The measuring medium can be a measuring fluid, such as an aqueous solution, emulsion or suspension.

The measurement circuit may further be adapted to generate a measuring signal based on the detected potential difference. It may be connected or connectable to a higher-level data processing electronics, for example a measuring transducer or transmitter, and may be designed to output the measuring signal to the higher-level data processing electronics. The data processing electronics may be configured to determine from the measuring signal a measured value of the measured variable to be determined by means of the potentiometric sensor, e.g., an analyte activity or concentration or the pH value, and to output and/or display it.

The measurement circuit may be electrically conductively connected to the sensor element by means of a line or conductor path made of an electrically conducting material and contacting the mixed-conducting ceramic of the substrate.

The present disclosure also relates to a method for producing a body which is formed from a mixed-conducting ceramic and may serve as substrate for the sensor element according to the present disclosure or the potentiometric sensor according to the present disclosure. The method comprises the steps of: producing a ceramic slip by mixing at least a first powder of a base material, a second powder of a mixed-valent oxide, and a binder system; and forming and firing the ceramic slip to form the body formed of the mixed-conducting ceramic.

A powder of an electrically non-conductive oxide, e.g., zirconium dioxide or aluminum oxide, may, for example, be used as the first ceramic powder. The oxide may be stabilized by means of one or more additives. Alternatively, the first ceramic powder may consist of an electrically non-conductive silicate, nitride, or carbide. The particle size of the powder may be in the low micrometer range or in the nanometer range. A powder of one or more mixed-valent oxides, e.g., of one or more of the aforementioned oxides, may be used as second ceramic powder. The particle size of the second ceramic powder is advantageously in the same order of magnitude as that of the first ceramic powder. This results in a homogeneous distribution of the components in the finished body formed from the mixed-conducting ceramic.

The method may comprise a thermal aftertreatment of the body formed from the mixed-conducting ceramic. This thermal aftertreatment may be carried out in a furnace or in a flame. It may, for example, in case of a relatively low mass fraction of the mixed-valent oxide in the ceramic of less than 50%, result in an increase of the electrical conductivity of the ceramic body.

Producing a slip may additionally comprise mixing one or more additives with the first powder, the second powder, and the binder system. Additives may be added, for example, in order to homogenize the slip, to increase the conductivity of the finished mixed-conducting ceramic, or to adjust the desired thermomechanical properties of the body formed from the mixed-conducting ceramic.

Forming the ceramic slip may be effected by customary shaping methods, e.g., by extrusion, pressing, or injection molding. Firing of the ceramic slip may take place at a temperature of between 1300° C. and 1500° C., advantageously at about 1400° C. After firing, the body may be brought into a final shape by means of mechanical finishing.

A method for producing a sensor element for a potentiometric sensor, such as a sensor element according to one of the above-described embodiments, comprises: applying a sensor layer, for example, an ion-selective layer or a non-selective electrode layer, to a region of a substrate consisting of a mixed-conducting ceramic; and electrically contacting the region with an electrically conductive terminal lead.

During measurement operation of the sensor element, the non-selective electrode layer serves as non-selective electrode in the sense that different ions or molecules contained in a solution contacting the electrode may give electrons to the electrode or accept electrons therefrom, and that the potential detectable with the electrode against a potential-constant reference electrode, e.g., an Ag/AgCl electrode, is thus influenced by the sum of the redox-active ions or molecules in the solution. The non-selective electrode is thus suitable for the potentiometric measurement of the redox potential of a measuring solution. The electrode layer may be formed from a metal, for example, a noble metal, a semiconductor, or a carbon-based material, such as the metals or carbon-based materials already mentioned above. A sensor element having such an electrode layer may be used to measure the redox potential in a liquid.

If the sensor layer is designed as an ion-selective layer, it may be formed from a pH-selective or sodium-selective glass or a matrix comprising an ionophore, e.g., a polymer matrix.

The substrate may be a body which is formed from the mixed-conducting ceramic and may be produced by means of the method described above. The substrate may also alternatively be formed by one or more layers applied one above the other to a base body, for example, a metallic or ceramic base body, wherein one or more or all of the several layers consist of the mixed-conducting ceramic. The thickness of the one layer or the total thickness of the layers of mixed-conducting ceramic may be at least 100 µm, preferably at least 200 µm. Such layers may, for example, be produced by application of a ceramic slip, which may be prepared completely analogously to the manner described above for the preparation of the ceramic body, to the base body and subsequent thermal treatment, e.g., firing, and an optional, subsequent mechanical finishing.

If the sensor layer consists of an ion-selective glass, e.g., a pH glass or a Na-selective glass, the ion-selective layer may be applied as a layer to the substrate by fusing a small glass plate or glass tube. This may take place under inert gas or in vacuo. Alternatively, the layer may also be applied to the substrate by application of a glass paste, a glass powder, or a glass-containing suspension and subsequent thermal treatment, e.g., in the furnace or in the flame, to form a homogeneous glass layer. The glass paste, the glass powder, or the suspension may be applied, for example, by dipping, spray-coating, or knife-coating. The application of the glass layer by laser ablation is likewise possible.

Advantageously, the temperature during fusing or during the thermal treatment is not more than 900 to 1000° C. However, it is also possible to briefly heat the substrate to higher temperatures when the ion-selective glass layer is applied.

If the sensor layer is formed as ion-selective layer from a polymer material, it may be applied in the form of a monomer or a prepolymer or the dissolved or suspended polymer may be applied to the substrate and covalently coupled to the substrate and/or dried or cured thermally or by irradiation. The polymer material may also be applied to the substrate in the form of polymer particles, and the polymer particles may subsequently be fused onto the substrate, forming a closed layer. The material may be applied by dipping, spray-coating, or knife-coating. The polymer layer may also be applied as a film to the substrate and optionally be adhesively bonded.

Metallic, semiconductor-based, or carbon-based sensor layers may be applied to the substrate by gas phase deposition, e.g., CVD (chemical vapor deposition), PVD (physical vapor deposition), sputtering, laser ablation, or plasma deposition.

The sensor layer may be applied in one or more steps by applying several layers successively. As already described above, several layers of the layer made of the same material or different materials, e.g., various glasses, may be applied, wherein at least the last, final layer of the layer stack formed in this way has ion-selective properties.

In a further step, the method may comprise the sheathing of a unit, comprising the sensor layer and the substrate, with an electrically insulating material such that a sheath formed in this manner leaves uncovered only a surface region of the sensor layer facing away from the substrate, wherein the electrically conductive terminal lead or a conductor contacting the electrically conductive terminal lead is fed through the sheath in order to contact the terminal lead from outside the sheath. The sheath insulates the unit from a measuring medium such that the measuring medium cannot reach the substrate when the uncovered surface of the sensor layer is brought into contact with the measuring medium. The sheathing may be effected, for example, by extrusion-coating, melting, gluing, or varnishing the unit.

In an advantageous embodiment, the following steps may be performed to sheath the unit comprising the sensor layer and the substrate: applying a powder comprising glass particles or a suspension comprising glass particles to the unit; and thermally treating the applied powder or suspension to form a glass layer forming the sheath.

The sheath may be applied in several layers or comprise several layers.

The glass particles may advantageously have one of the compositions described in EP 1 231 189 A1. The glass layer thus produced forms an enamel-like coating in this case.

In an advantageous embodiment, the substrate used in this method may be a body formed from a mixed-conducting ceramic, for example, produced according to the method described above. Alternatively, the substrate may be formed by one or more layers applied one above the other to a base body, for example, a metallic or ceramic base body, wherein the layer consists of the mixed-conducting ceramic.

BRIEF DESCRIPTION OF THE DRAWINGS

The present disclosure is explained in further detail below on the basis of the exemplary embodiments shown in the figures. In the figures.

DETAILED DESCRIPTION

Figure 1:
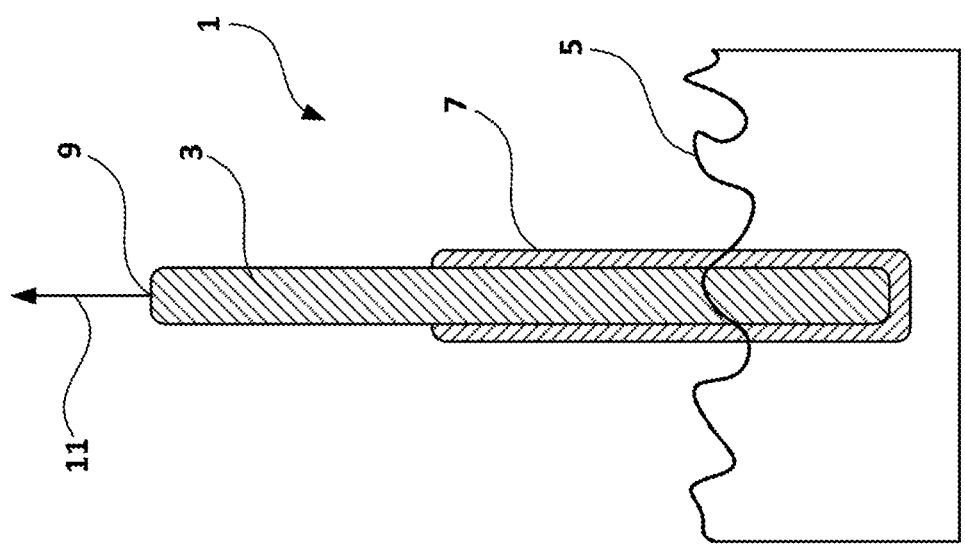
FIG. 1 shows a sensor element for a potentiometric sensor according to an exemplary embodiment.

FIG. 1 schematically shows a sensor element 1 for a potentiometric sensor according to a first exemplary embodiment. The sensor element 1 has a substrate in the form of a rod-shaped body 3, made of a mixed-conducting ceramic, and an ion-selective layer 7, which serves as a sensor layer and is arranged directly on the rod-shaped body 3 in a front section of the sensor element 1, intended for contact with a liquid measuring medium 5. In the present exemplary embodiment, the ion-selective layer 7 consists of a sodium-sensitive or pH-sensitive glass, e.g., McInnes glass, Corning 015 glass, or one of the glasses known from U.S. Pat. No. 3,458,422, which is arranged on the body 3 in one or more layers arranged one above the other. The glasses mentioned in U.S. Pat. No. 3,458,422 contain a proportion of $Li_2O$ and are free of $Na_2O$ such that the cross-sensitivity of pH measurements with a sensor layer of one of these glasses is reduced. The mixed-conducting ceramic in the present example consists of a base material, e.g., $Al_2O_3$, $ZrO_2$, or yttrium-stabilized $ZrO_2$, and a mixed-valent oxide, in the present example, $Fe_3O_4$. On the rear side, i.e., on its side facing away from the measuring medium 5, the rod-shaped body 3 has a contact point 9, at which the ceramic of the body 3 is electrically contacted by an electrical conductor 11, e.g., a metallic wire or a metallic conductor path. The contact point 9 may be formed by an electrically conductive coating, e.g., made of metal, applied to the body 3. This conductor 11 may be connected to a measurement circuit of a potentiometric sensor.

The mixed-conducting ceramic from which the body 3 is formed may consist of a plurality of oxidic constituents and optionally further additives. Instead of $Fe_3O_4$ or in addition to $Fe_3O_4$, mixed-valent transition metal oxides, tungsten bronzes, molybdenum bronzes, or a compound of the structure type of the tungsten bronzes may be used as conductive oxidic constituents. Suitable tungsten bronzes are, for example, compounds of the formula $A_xWO_3$, where x is between 0 and 1, and A is, for example, sodium, lithium, potassium, or rubidium.

In addition to one or more mixed-valent metal oxides, the ceramic may contain one or more oxides of metals of groups 5 to 10 of the periodic table of elements (CAS numbers Vb to VIIIb) and/or oxides of lanthanum or lanthanoids.

The mixed-conducting, i.e., both ion-conducting and electron-conducting, ceramic body 3 serves as a solid terminal lead for a half-cell potential forming on the ion-selective layer 7 in contact with the measuring medium 5. In the present example, the ion-selective layer 7 is applied directly to the body 3. An adhesion-promoting intermediate layer is not required. The glass forming the ion-selective layer 7 and the ceramic forming the body 3 are selected such that their coefficients of thermal expansion differ from each other by less than 10%. It is advantageous if the coefficient of thermal expansion of the body 3 is higher than that of the ion-selective layer 7. Coefficients of thermal expansion of known pH glasses are around $10^{-6}$ $K^{-1}$, e.g., the coefficient of expansion of Corning 015 glass is $11 \cdot 10^{-6}$ $K^{-1}$ or that of the glasses known from U.S. Pat. No. 3,458,422 is between 9.3 and $10.4 \cdot 10^{-6}$ $K^{-1}$. A ceramic formed from yttrium-stabilized $ZrO_2$ as base material and $Fe_3O_4$ as mixed-conducting oxide may, depending on the proportion of the base material and the mixed-conducting oxide in the ceramic, have a coefficient of thermal expansion between $9-10 \cdot 10^{-6}$ $K^{-1}$.

In an alternative embodiment, the sensor layer may be formed as a layer of an electrically conductive material suitable as an electron donor or acceptor for potentiometric measurements of the redox potential of the measuring medium 5, e.g., of platinum, gold, or rhodium, a semiconductor or a carbon-based material, such as graphite, glassy carbon, carbon fibers, or boron-doped diamond.

Figure 2:
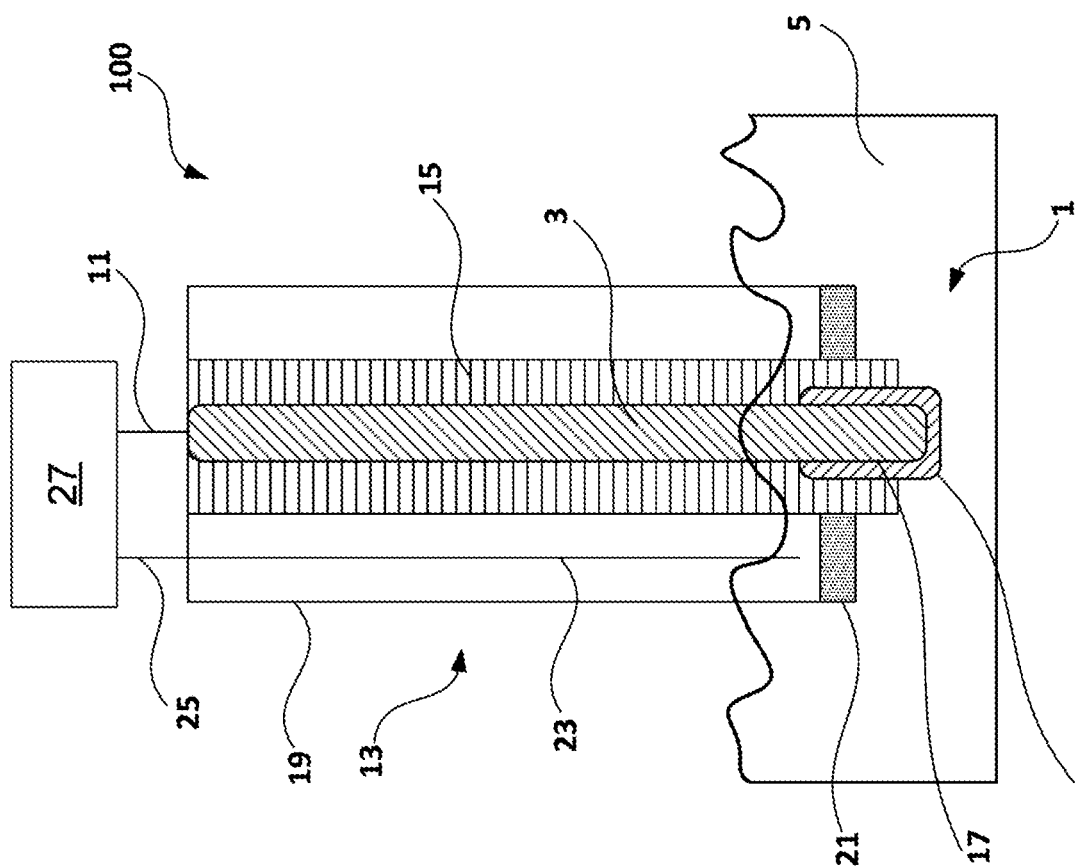
FIG. 2 shows a potentiometric sensor having a sensor element according to the exemplary embodiment of FIG. 1.

FIG. 2 shows a schematic longitudinal section illustration of a potentiometric sensor 100 for measuring an activity of an analyte ion or a measured variable dependent thereon, e.g., a pH value, with a sensor element 1 as measuring half-cell and a reference half-cell 13.

The sensor element 1 essentially structurally corresponds to the sensor element 1 shown in FIG. 1. The sensor element 1 has as a sensor layer an ion-selective layer 7, e.g., a layer of a pH-selective glass or an ion-selective polymer layer, which is applied to a cylindrical body 3 of a mixed-conducting ceramic serving as a substrate. The sensor element 1 in the exemplary embodiment shown here comprises a sheath 15 which surrounds the body 3 and only leaves uncovered a surface of the layer 7 and which insulates the body 3 and an interface 17 between the body 3 and the layer 7 applied thereto from a liquid measuring medium 5. The sheath 15 may be formed, for example, from an electrically insulating ceramic, glass, or a polymer. It surrounds the body 3 and an edge region of the layer 7 intimately so that no liquid, for example, not the measuring medium 5, may reach the body 3.

The sheath 15 may be produced using methods which are known in connection with enameling metal substrates. Suitable materials for the sheath 15 and suitable methods for applying the sheath 15 to the unit, formed from the body 3 and the ion-selective layer 7, may, for example, be taken from EP 1 231 189 A1. The sheath 15 may be produced by applying particles of a glass composition of 0 to 4% $Li_2O$ (percentages respectively correspond to mass fractions of said components in this case), 0 to 4% $K_2O$, 9 to 15% $Na_2O$, 0 to 6% CaO, 0 to 3% of MgO, 55 to 75% $SiO_2$, 0.5 to 3% $B_2O_3$, 0 to 2% $Al_2O_3$, and 8 to 14% $ZrO_2$ to the body 3 and the layer 7 and subsequent thermal treatment.

The reference half-cell 13 may be formed as a conventional electrode of the second type, e.g., as silver/silver chloride electrode. In the example shown here, the reference half-cell 13 comprises a tubular housing 19 which surrounds a portion of the sheath 15 of the body 3 and which is closed at its front end facing the measuring medium 5 by an annular diaphragm 21. The diaphragm 21 may be formed, for example, from a plastic, e.g., PTFE, or from a porous ceramic, e.g., a $ZrO_2$ ceramic. The annular chamber formed between the sheath 15 and the housing 19 contains a reference electrolyte, e.g., a KCl solution, in which a reference element 23, e.g., a silver electrode coated with silver chloride, is immersed. Instead of a diaphragm 21, the reference half-cell 13 may also have another bridge which establishes an ion-conducting and/or an electrolytic contact between the reference electrolyte and the measuring medium 5. The annular chamber containing the reference electrolyte is closed on its rear side, e.g., by casting or adhesive bonding.

On the rear side, the body 3 is electrically conductively connected to a measurement circuit 27 via a first electrical line 11, and the reference element 23 is electrically conductively connected to the measurement circuit 27 via a second electrical line 25. The measurement circuit 27 is configured to detect a voltage arising in contact of the diaphragm 21 and the ion-selective layer 7 with the measuring medium 5 between the measuring half-cell 1 and the reference half-cell 13. This voltage depends on the activity of the analyte ion present on the ion-selective layer 7. The measurement circuit 27 may be configured to generate a measuring signal representing the detected voltage and to output it, e.g., to a measuring transducer connected to the measurement circuit 27, which transducer processes the measuring signal, and to determine therefrom, using a predetermined calibration function, a measured value of the ion concentration of the analyte ion or, if the potentiometric sensor 100 is adapted as a pH sensor, of the pH value. Alternatively, the measurement circuit 27 may also be configured to determine the measured value and to output it to a measuring transducer or another operating or display device.

In an alternative embodiment of the sensor 100, the sensor layer may be formed as a layer of an electrically conductive material suitable as an electron donor or acceptor for potentiometric measurements of the redox potential of the measuring medium 5, e.g., of platinum, gold, or rhodium, a semiconductor or a carbon-based material, such as graphite, glassy carbon, carbon fibers, or boron-doped diamond.

Figure 3:
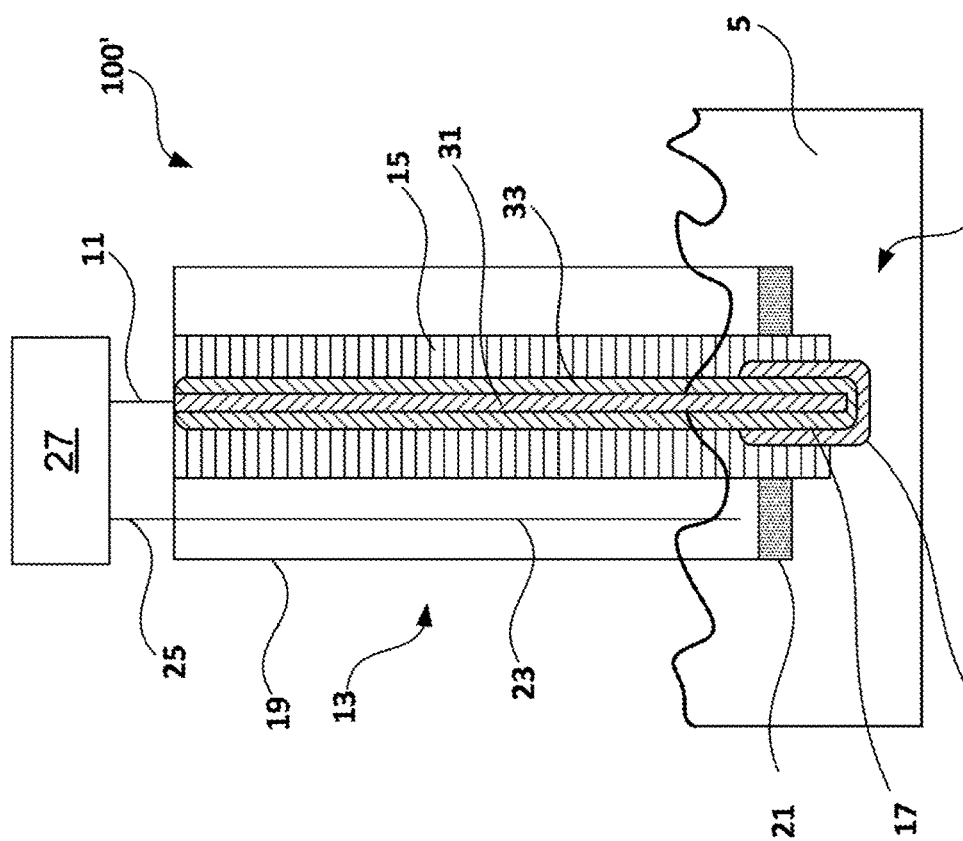
FIG. 3 shows a potentiometric sensor having a sensor element according to another exemplary embodiment.

Schematically shown in FIG. 3 is a further exemplary embodiment of a potentiometric sensor 100'. This sensor 100' is adapted and produced substantially identically to the sensor 100 illustrated in FIG. 2. Similar components are denoted by identical reference symbols. In contrast to the sensor element 1 of the sensor 100 shown in FIG. 2, the sensor element 1' shown in FIG. 3 does not have a solid body 3 formed from a mixed-conducting ceramic as substrate for the ion-selective layer 7, serving as sensor layer. Instead, it has an electrically conducting body 31 made from a metal, e.g., stainless steel, on which a coating 33 from a mixed-conducting ceramic is formed. The ion-selective layer 7 is applied to the coating 33. The functionality of the sensor 100' shown FIG. 3 is the same as that of the sensor 100 shown in FIG. 2.

Figure 4:
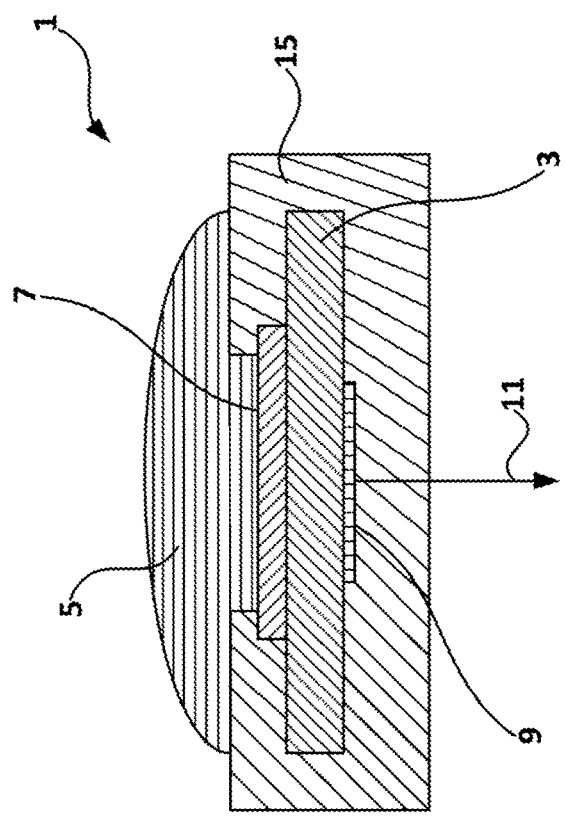
FIG. 4 shows a sensor element for a potentiometric sensor according to a further exemplary embodiment.

FIG. 4 schematically shows another exemplary embodiment of a sensor element 1 for a potentiometric sensor. This sensor element 1 has a body 3 made of a mixed-conducting ceramic which may, for example, be composed as described for the preceding exemplary embodiments. An ion-selective layer 7 serving as a sensor layer, for example of an ion-selective glass or of an ionophore-containing polymer matrix, is applied to the body 3. In the present example, the ion-selective layer 7 is formed from multiple layers of the same material. This ensures that the ion-selective layer 7 is completely closed, i.e., the surface of the body 3 is completely covered by the ion-selective layer. In an alternative embodiment, the ion-selective layer 7 may be formed from multiple layers, wherein one or more layers arranged on or near the body 3 are formed from a material, e.g., polymer or glass, which has a high electrical conductivity, while one or more upper layers, including the uppermost layer intended for contact with the liquid measuring medium 5, are formed from an ion-selective material, e.g., a pH glass or an ionophore-comprising polymer.

On the rear side, i.e., on its rear side facing away from the ion-selective layer 7, the body 3 has a metal layer serving as contact point 9. The unit formed from the body 3, the ion-selective layer 7, and the contact point 9 is surrounded by a sheath 15, e.g., of an electrically insulating plastic, a glass, or an electrically insulating ceramic, which insulates the body 3, the contact point 9, and the interface formed between the body 3 and the ion-selective layer 7 from the measuring medium 5. An electrical line 11, which is electrically conductively connected to the contact point 9, is fed through the sheath 9 and enables the conductive connection of the sensor element 1 to a measurement circuit.

A potentiometric sensor comprising the sensor element 1 shown here as a measuring half-cell may have a reference half-cell, also completely formed by a layer stack, whose potential terminal lead is adapted as a solid terminal lead. Both half-cells may be arranged on a common base body, e.g., a circuit board or a non-conductive ceramic, and be connected to a measurement circuit via electrical lines, e.g., conductor paths extending on the base body. In this way, a very compact potentiometric sensor may be realized.

Figure 5:
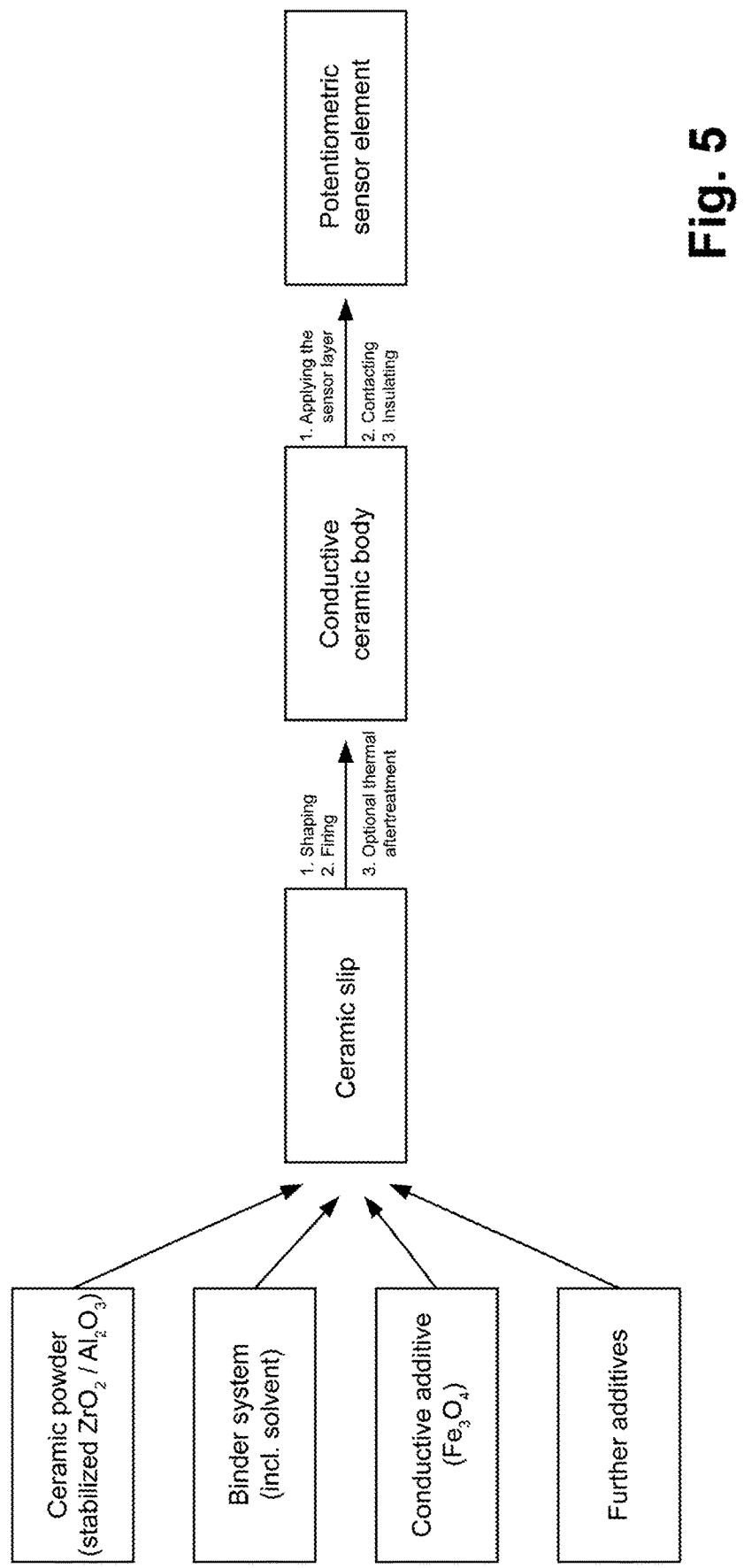
FIG. 5 shows a flow chart of a method for producing a sensor element.

A method for producing a sensor element for a potentiometric sensor for determining a measured variable depending on the activity of an analyte is described below with reference to the flow chart shown in FIG. 5. In a first step, several components are mixed to form a ceramic slip. A first component is a ceramic powder of a base material, e.g., Y-stabilized $ZrO_2$ or $Al_2O_3$. A second component is a conductive additive, e.g., a powder of a mixed-valent transition metal, such as $Fe_3O_4$, or another of the aforementioned transition metal oxides or one of the aforementioned bronzes. It is also possible that, in addition to the first component, not only one but several different conductive additives in powder form are used as further components in order to form the slip. A binder system which also comprises a solvent is added to the powders used, which advantageously have a grain size in the range of a few nanometers to a few micrometers. Optional further additives, which may serve, for example, to homogenize the slip, to increase the conductivity of the ceramic to be produced from the slip, or to adjust the desired thermomechanical properties, may be added to the slip.

The ceramic slip is shaped in further steps, e.g., by extrusion, injection-molding, or pressing, and fired. A firing temperature suitable for a ceramic of $ZrO_2$, optionally stabilized by an additive, or $Al_2O_3$ as base material and a transition metal oxide, e.g., $Fe_3O_4$, is between 1300° C. and 1600° C. A firing temperature around 1400° C., e.g., between 1350° C. and 1450° C., has proven to be advantageous. Where appropriate, a thermal aftertreatment may be carried out to increase the conductivity of the ceramic thus obtained. Experiments have shown that such an aftertreatment may advantageously increase the electrical conductivity in ceramics that have a low mass fraction of the conductive component, e.g., between 25% and 50%.

Optionally, the thus obtained conductive body made of a mixed-conductive ceramic may be brought into a desired shape by mechanical finishing. In a further step, the conductive ceramic body is provided with a sensor layer.

The material forming the sensor layer, and accordingly also the method for applying the sensor layer to the ceramic body, depends on the measured variable to be determined by means of the sensor element to be produced. In order to produce a layer of an ion-selective glass, e.g., for pH measurement or for the measurement of certain analyte ions, such as sodium, a small glass plate made of pH-selective or ion-selective glass may be fused onto the surface of the mixed-conductive ceramic body. In an alternative method, it is possible to apply a glass powder or a glass paste of the glass to the surface of the conductive ceramic body and to subject it to a subsequent thermal treatment in the furnace or in a gas flame. The temperature preferably used in both method variants is below 1400° C., preferably at temperatures between 900° C. and 1100° C. An increase to above 1300° C. is possible but should only occur briefly in order to not influence the properties of the ceramic body to a further extent.

In order to produce an ion-selective polymer layer, a polymer comprising an ionophore may be applied to the surface in solution or in the form of polymer particles and dried or fused on the surface. The layer may be applied in several layers, i.e., by repeating the coating method several times.

In order to produce a non-ion-selective layer serving as an electron donor or acceptor for a measurement of the redox potential, a metal or semiconductor or a carbon-based material may be applied to the body by means of known gas-phase deposition methods, e.g., PVD (physical vapor deposition), CVD (chemical vapor deposition), laser ablation, sputtering, plasma deposition, or also by means of deposition from a solution.

In a further step, the ceramic body is provided with an electrical contact point for electrical connection to a measurement circuit. This may be done, for example, by applying a metallic coating to the ceramic body. The contact point, e.g., the metallic coating, may be connected to an electrical line for contacting a measurement circuit.

In a final step, the ceramic body may be insulated. This may take place by surrounding the ceramic body with a sheath made of an electrically insulating material, e.g., plastic, glass, or an electrically insulating ceramic. The sheath may completely cover the ceramic body and an interface present between the sensor layer and the ceramic body such that a liquid contacting a region of the sensor layer not covered by the sheath does not come into contact with the ceramic body, not even by penetrating into the contact region between the sensor layer and the body. The sheath may be produced, for example, by encasing in a housing sealed from the body or the ion-selective layer or by casting, adhesive bonding, extrusion coating, melting, or varnishing.

Another possible method for producing the sheath on the unit consisting of the ceramic body and the layer, e.g., with a glass or enamel-like layer of the glass composition mentioned above in connection with FIG. 2, may comprise the following steps: (a) grinding the glass composition with, preferably fully desalinated, water to produce an aqueous suspension, also referred to as slip; (b) adjusting the consistency of the slip using adjusting means (optionally); (c) wet application of the slip to the unit to be coated; (d) drying the applied slip; and (e) thermal treatment of the slip, e.g., by annealing and/or sintering.

Another method for producing the sheath on the unit consisting of the body and the layer with a layer formed from the aforementioned glass composition may comprise the following steps: (a) dry application of the glass composition present as a powder to the unit; and (b) thermal treatment of the applied glass composition, e.g., by annealing and/or sintering.

The step of grinding the glass composition may be omitted if the glass composition is already in powder form or in the form of a suspension (slip).

According to a further alternative, a combined wet/dry application of the glass composition in a single production step is also possible.

These methods are advantageously suitable for a sheath of the unit formed from the sensor layer and the ceramic body because the temperatures during the thermal treatment of the applied glass particles to form the glass layer serving as a sheath are in a range between 760° C. and 950° C., in which the properties of the sensor layer or of the ceramic forming the body are not influenced or only influenced to a negligible extent.

The electrical line connected to the contact point is fed through the sheath to allow the contacting of the electrical body by a measurement circuit arranged outside the sheath.

Figure 6:
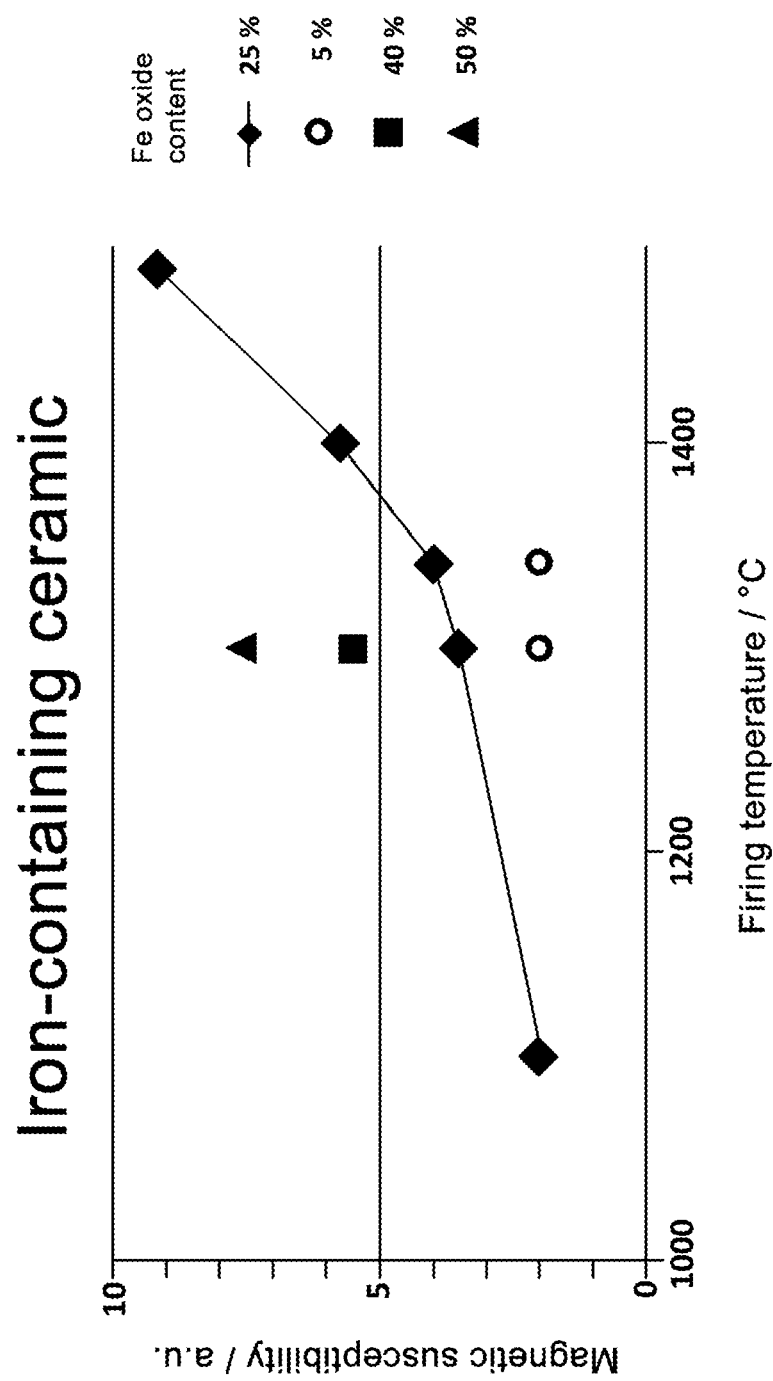
FIG. 6 shows a diagram of the magnetic susceptibility of mixed-conductive ceramic bodies from a ceramic comprising $ZrO_2$ and $Fe_3O_4$ with different $Fe_3O_4$ mass fractions as a function of the temperature.

FIG. 6 shows measurement results of a measurement of the magnetic susceptibility of mixed-conducting ceramic bodies produced according to the methods described above with different compositions and at different firing temperatures. In order to detect the measured values, the ceramic bodies were inserted as a core into a coreless measuring coil after firing, and their inductance was measured. The magnetic susceptibility of the ceramic bodies derived from these measurements is plotted in arbitrary units (a.u.) in the graph shown in FIG. 5 against the firing temperature in ° C.

Ceramic bodies based on Y-stabilized $ZrO_2$ as base material and $Fe_3O_4$ as conductive additive with four different compositions were examined. The fired ceramic contained a mass fraction of 5% $Fe_3O_4$ (circles) in a first of the compositions examined, 25% $Fe_3O_4$ (diamonds with connecting lines) in a second composition, 40% $Fe_3O_4$ (square) in a third composition, and 50% $Fe_3O_4$ (triangle) in a fourth composition. With a 5% $Fe_3O_4$ fraction, no increased magnetic susceptibility may be seen even at elevated firing temperatures. A 25% $Fe_3O_4$ mass fraction shows an increasing magnetic susceptibility of the ceramic bodies as the firing temperature increases. With an increasing $Fe_3O_4$ mass fraction at the firing temperature of 1300° C., an increase in the magnetic susceptibility may also be observed. Increasing magnetic susceptibility is also accompanied by increasing ion conductivity and electron conductivity.

According to these measurement results, ceramic bodies with an $Fe_3O_4$ mass fraction between 25% and 90% are therefore suitable as substrates for the sensor elements described here. To achieve high conductivities, firing temperatures between 1200 and 1400° C. and mass fractions of more than 40% are preferred.

The invention claimed is:

1. A sensor element for a potentiometric sensor, comprising:
    a substrate; and
    a potentiometric sensor layer disposed on the substrate, wherein the substrate has at least one area electrically conductively connected to the sensor layer,
    wherein the at least one area of the substrate that is electrically conductively connected to the sensor layer comprises a mixed-conducting ceramic, wherein the mixed-conducting ceramic includes at least one base ceramic material and at least one mixed-valent oxide, and wherein the at least one mixed-valent oxide has a mass fraction of 25 to 90% in the ceramic such that the ceramic has both ion conductivity and electron conductivity while remaining mechanically stable when exposed to severe temperature fluctuations.

2. The sensor element of claim 1, wherein the sensor layer forms an inert, non-selective electrode of a noble metal, a semiconductor-based material or carbon-based material.

3. The sensor element of claim 2, wherein the carbon-based material is graphite, glassy carbon, or boron-doped diamond.

4. The sensor element of claim 1, wherein the sensor layer forms an ion-selective layer.

5. The sensor element of claim 4, wherein the sensor layer is formed from an ion-selective glass, an ion-conducting metal salt or a matrix material including an ionophore.

6. The sensor element of claim 1, wherein the substrate is a body formed of the mixed-conducting ceramic.

7. The sensor element of claim 1, wherein the sensor layer is configured as a single-layer or multi-layer coating applied directly to the substrate.

8. The sensor element of claim 1, wherein the at least one base ceramic material is aluminum oxide ($Al_2O_3$) or zirconium dioxide ($ZrO_2$).

9. The sensor element of claim 1, wherein the mixed-valent oxide is a mixed-valent transition metal oxide.

10. The sensor element of claim 9, wherein the mixed-valent transition metal oxide is iron (II,III) oxide ($Fe_3O_4$), a tungsten bronze, a molybdenum bronze, or a mixed-valent compound of the structure type of the tungsten bronzes.

11. The sensor element of claim 1, wherein, in addition to the at least one base material and the at least one mixed-valent oxide, the ceramic further includes at least one or more additives, wherein the one or more further additives are selected from the group consisting of oxides of groups 5 to 10 of the periodic table and oxides of lanthanum or lanthanoids.

12. The sensor element of claim 1, wherein a coefficient of thermal expansion of the substrate differs from a coefficient of thermal expansion of the sensor layer by no more than ±10%.

13. The sensor element of claim 1, wherein the region of the substrate electrically conductively connected to the sensor layer is connected to a terminal lead of an electrically conductive material.

14. A potentiometric sensor comprising:
at least one sensor element according to claim 1;
a reference electrode; and
a measurement circuit electrically conductively connected to the sensor element and to the reference electrode and configured to detect a potential difference between the sensor element and the reference electrode.

15. The potentiometric sensor of claim 14, wherein the measurement circuit is electrically conductively connected to the sensor element by a terminal lead that electrically contacts the mixed-conducting ceramic of the substrate.

16. A method for producing a mixed-conducting ceramic body, the method comprising:

producing a slip mixture by mixing at least a first powder of a base material, a second powder of a mixed-valent oxide, and a binder system;
forming a ceramic slip from the slip mixture; and
firing the ceramic slip to form the mixed-conducting ceramic body, wherein the mixed-valent oxide has a mass fraction of 25 to 90% in the ceramic such that the ceramic has both ion conductivity and electron conductivity while remaining mechanically stable when exposed to severe temperature fluctuations.

17. The method of claim 16, further comprising a thermal aftertreatment of the mixed-conducting ceramic body.

18. The method of claim 16, wherein producing the slip mixture further includes mixing one or more additives with the first powder, the second powder and the binder system.

19. The method of claim 16, wherein firing the ceramic slip is performed at a temperature of between 1300° C. and 1500° C.

20. A method for producing a sensor element for a potentiometric sensor, the method comprising:
applying a sensor layer to a region of a substrate that comprises a mixed-conducting ceramic, wherein the mixed-conducting ceramic includes at least one base ceramic material and at least one mixed-valent oxide, and wherein the at least one mixed-valent oxide has a mass fraction of 25 to 90% in the ceramic such that the ceramic has both ion conductivity and electron conductivity while remaining mechanically stable when exposed to severe temperature fluctuations; and
electrically contacting the region with an electrically conductive terminal lead.

21. The method of claim 20, wherein sensor layer is an ion-selective layer or a non-selective electrode layer.

22. The method of claim 20, further comprising partially sheathing the sensor layer and the substrate with an electrically insulating material such that at least a portion of a surface of the sensor layer opposite the substrate remains unsheathed, wherein the terminal lead, or a conductor in contact with the terminal lead, is fed through the sheathing as to enable electrical contact with the terminal lead from outside the sheathing.

23. The method of claim 22, wherein partially sheathing the sensor layer and the substrate includes:
applying a powder including glass particles or a suspension of glass particles to the sensor layer and the substrate; and
thermally treating the applied powder or suspension to form a glass layer forming the sheathing.

24. The method of claim 20, wherein the substrate is a body formed from the mixed-conducting ceramic and produced according to the method according to claim 16.

* * * * *